(12) United States Patent
Wakabayashi (10) Patent No.: US 8,786,879 B2
(45) Date of Patent: Jul. 22, 2014

(54) INFORMATION PROCESSING APPARATUS, INFORMATION PROCESSING METHOD, AND STORAGE MEDIUM TO RESELECT IMAGE DATA

(75) Inventor: Yuuki Wakabayashi, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 13/030,430

(22) Filed: Feb. 18, 2011

(65) Prior Publication Data

US 2011/0222114 A1 Sep. 15, 2011

(30) Foreign Application Priority Data

Mar. 11, 2010 (JP) .................................. 2010-054825

(51) Int. Cl.
*G06F 15/00* (2006.01)
*G06K 1/00* (2006.01)
*G06K 15/00* (2006.01)

(52) U.S. Cl.
USPC ........................ 358/1.15; 358/1.9; 358/1.14

(58) Field of Classification Search
None
See application file for complete search history.

(56) References Cited

U.S. PATENT DOCUMENTS

| 2001/0035973 | A1 | 11/2001 | Kusumoto | |
|---|---|---|---|---|
| 2002/0012560 | A1* | 1/2002 | Miyasaka et al. | 400/582 |
| 2003/0147548 | A1* | 8/2003 | Ruhl et al. | 382/100 |
| 2005/0068566 | A1* | 3/2005 | Nishiguchi | 358/1.15 |
| 2005/0195430 | A1* | 9/2005 | Shinohara et al. | 358/1.15 |
| 2006/0044593 | A1* | 3/2006 | Kawakami et al. | 358/1.14 |
| 2006/0274373 | A1* | 12/2006 | Niitsuma | 358/1.16 |
| 2007/0177185 | A1* | 8/2007 | Ogura et al. | 358/1.14 |
| 2009/0116052 | A1* | 5/2009 | Matsuzawa | 358/1.14 |
| 2011/0302419 | A1* | 12/2011 | Yoshioka et al. | 713/179 |

FOREIGN PATENT DOCUMENTS

| JP | 11-041385 A | 2/1999 |
|---|---|---|
| JP | 2009-118082 A | 5/2009 |

* cited by examiner

*Primary Examiner* — Ming Hon
(74) *Attorney, Agent, or Firm* — Canon USA, Inc., IP Division (57) ABSTRACT

An information processing apparatus includes a first acquisition unit, a storage unit, a second acquisition unit, and an identification unit. The first acquisition unit acquires first identification information for identifying first image data selected as a print target. The storage unit causes a storage device to store the first identification information acquired by the first acquisition unit. The second acquisition unit acquires second image data when print processing is resumed after the print processing is once suspended and acquire second identification information for identifying the second image data. The identification unit identifies image data that matches the first image data from the second image data based on the first identification information and the second identification information.

13 Claims, 5 Drawing Sheets

INFORMATION PROCESSING APPARATUS, INFORMATION PROCESSING METHOD, AND STORAGE MEDIUM TO RESELECT IMAGE DATA

BACKGROUND OF THE INVENTION

1. Field of the Invention

The present invention relates to a technique for identifying image data selected as a print target when print processing is resumed after the print processing is once suspended.

2. Description of the Related Art

Such a technique is known that image data is replicated to hold the image data in order to resume print processing without requiring a user to reselect the image data in a case where the print processing of the image data is suspended and the image data as a print job is deleted. In other words, when the print processing is suspended according to an occurrence of an error while the image data is subjected to the print processing and a power is turned off, the image data within a random access memory (RAM) that is processed at a time of the occurrence of the error is erased, thus resulting in a requirement to cause the user to reselect the image data. Therefore, in a technique discussed in Japanese Patent Application Laid-open No. 11-041385, image data as a print target to be retained in a RAM is caused to be stored also in an external storage device and, when the power is turned ON, the image data is downloaded from the external storage device to resume the print processing. Accordingly, a step for reselecting the image data by the user can be omitted.

However, the replication processing of the image data requires a capacity for storing the thus replicated image data as well as the replication processing of the image data itself is a heavy load. Therefore, an apparatus having a relatively lower processing capacity, such as a portable terminal, requires more time for performing the replication processing of the image data, thus resulting in lower usability.

Further, such an apparatus is known that a predetermined piece of image data designated from a plurality of pieces of image data totally controlled by an operating system is temporarily received by an application from the operating system to load the image data into the RAM in order to execute print processing of the image data. Some of such apparatuses include no unit for identifying image data, e.g., a path or image identification data (ID). In a case where the print processing is suspended and the application is closed, the image data loaded into the RAM is discarded. Consequently, the selected image data cannot be easily identified when the print processing is resumed upon a restart of the application. Namely, it is difficult to restore a selected condition of the image data to a previous state in which the print processing is not suspended.

SUMMARY OF THE INVENTION

The present invention is directed to an information processing apparatus that can execute processing for identifying image data selected as a print target, when the print processing is resumed after the print processing is once suspended, within a processing time shorter than a time required in replication processing of the image data and with a storage capacity less than a capacity required in replication processing of the image data.

According to an aspect of the present invention, an information processing apparatus includes a first acquisition unit, a storage unit, a second acquisition unit, and an identification unit. The first acquisition unit acquires first identification information for identifying first image data selected as a print target. The storage unit causes a storage device to store the first identification information acquired by the first acquisition unit. The second acquisition unit acquires second image data when print processing is resumed after the print processing is once suspended and acquire second identification information for identifying the second image data. The identification unit identifies image data that matches the first image data from the second image data based on the first identification information and the second identification information.

According to an exemplary embodiment of the present invention, the processing for identifying the image data selected as the print target when the print processing is resumed after the print processing is once suspended can be executed within a processing time shorter than a time required in executing replication processing of the image data and with a storage capacity less than a capacity required in executing the replication processing of the image data.

Further features and aspects will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
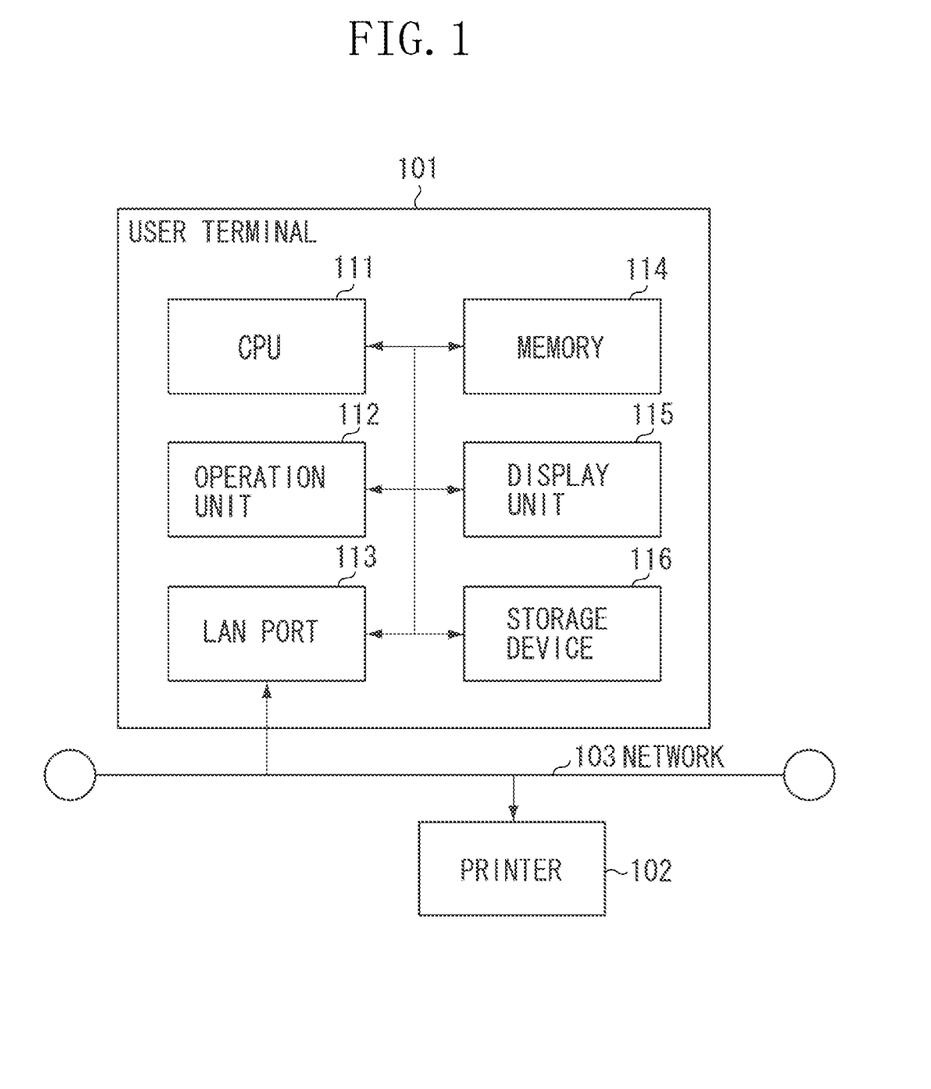
FIG. 1 schematically illustrates a configuration of a printing system according to an exemplary embodiment.

FIG. 1 schematically illustrates a configuration of a printing system according to a first exemplary embodiment. In FIG. 1, the printing system includes a user terminal 101 and a printer 102 connected to each other via a network 103. In FIG. 1, each of the user terminal 101 and the printer 102 has an independent network configuration. The network configuration that is applicable to the embodiments, however, is not limited to the above. Further, the user terminal 101 is a mere example of an information processing apparatus according to the present exemplary embodiment.

In the printing system according to the present exemplary embodiment, the user terminal 101 and the printer 102 establish a mutual communication according to the Transmission Control Protocol (TCP) or the Internet Protocol (IP). The user terminal 101 includes a central processing unit (CPU) 111 configured to totally control the user terminal 101, an operation unit 112 configured to allow a user to issue an instruction to the user terminal 101, a local area network (LAN) port 113 configured to connect the user terminal 101 to the network 103, a memory 114, a display unit 115 such as a liquid crystal panel, and a storage device 116 such as a hard disk.

The memory 114 is a random access memory (RAM) serving as a work area for the CPU 111. The storage device 116 stores the below described various control programs such as a printer driver, an application, and an operating system. The LAN port 113 is connected to the network 103 so as to connect the user terminal 101 to the printer 102 via the network 103.

Figure 2:
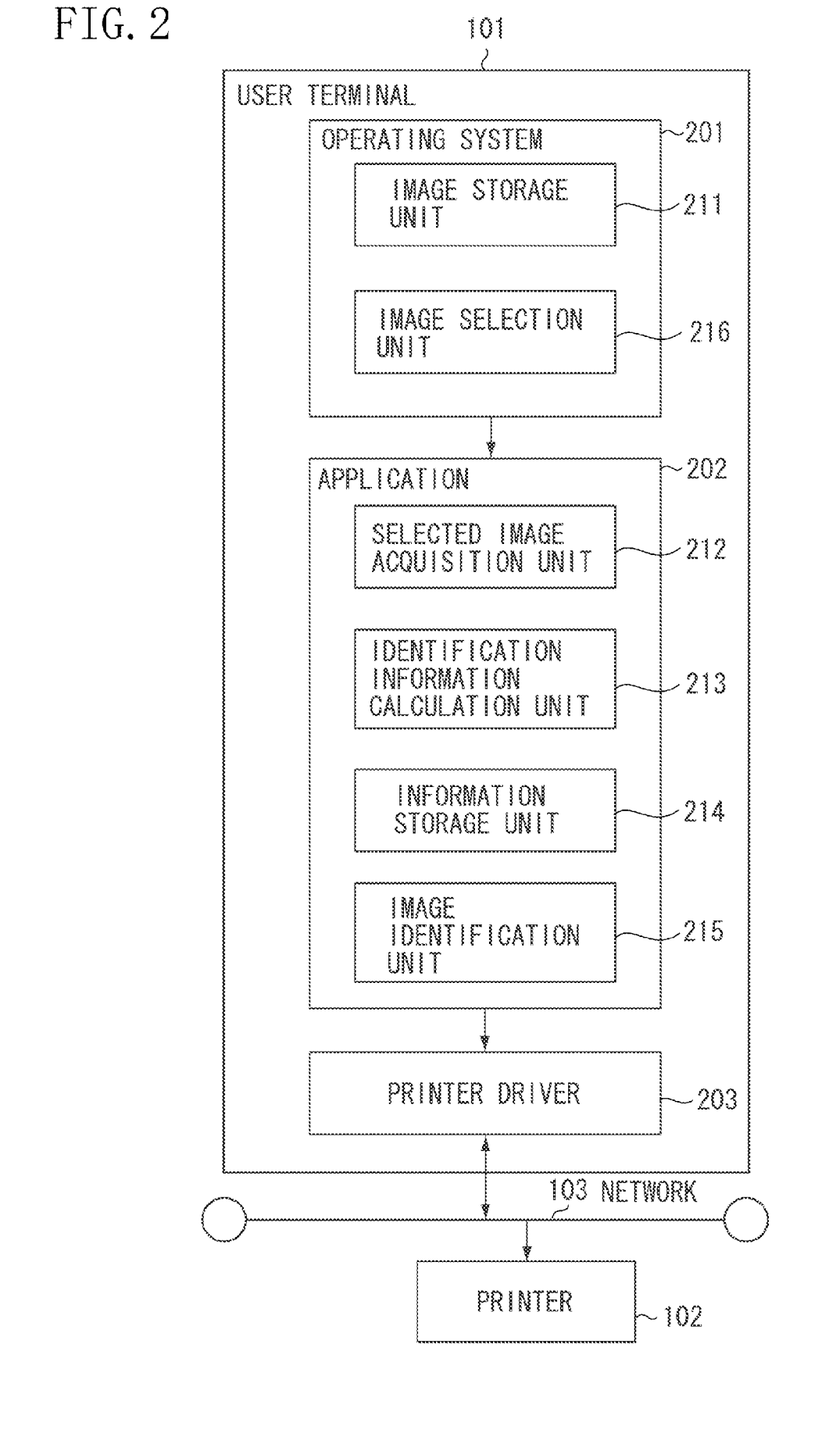
FIG. 2 illustrates a configuration of software of a user terminal.

FIG. 2 illustrates a configuration of software of the user terminal 101. The user terminal 101 includes an operating system (hereinafter referred to as the "OS") 201, an application (hereinafter referred to as the "AP") 202, and a printer driver 203. These software programs are stored in the storage device 116 to be executed by the CPU 111 after being loaded into the memory 114.

The OS 201 includes an image storage unit 211 configured to cause the memory 114 or the storage device 116 to store image data within the user terminal 101 and an image selection unit 216 configured to acquire the image data that is selected by the user as a print target from the storage device 116 to load the image data into the memory 114.

The AP 202 includes a selected image acquisition unit 212, an identification information calculation unit 213, an information storage unit 214, and an image identification unit 215. The selected image acquisition unit 212 acquires the image data that the user selected as the print target. In a case where the user selects all the pieces of image data stored in the storage device 116, the selected image acquisition unit 212 acquires all the pieces of image data. The identification information calculation unit 213 obtains identification information for identifying the image data acquired by the selected image acquisition unit 212. The identification information is described below in detail.

The information storage unit 214 stores a combination of predetermined print setting information set by the user as to image data and identification information of the image data in the memory 114 or the storage device 116 as image information for each piece of image data. The information storage unit 214 switches a recording destination of the print setting information or the identification information between the memory 114 and the storage device 116 according to the processing thus performed. The image identification unit 215 identifies the image data acquired by the selected image acquisition unit 212 based on the identification information of each of the pieces of image data. The printer driver 203 receives the image data that is selected by the user as the print target from the AP 202 and transmits the image data to the printer 102 after converting the image data into a printable format.

Figure 3:
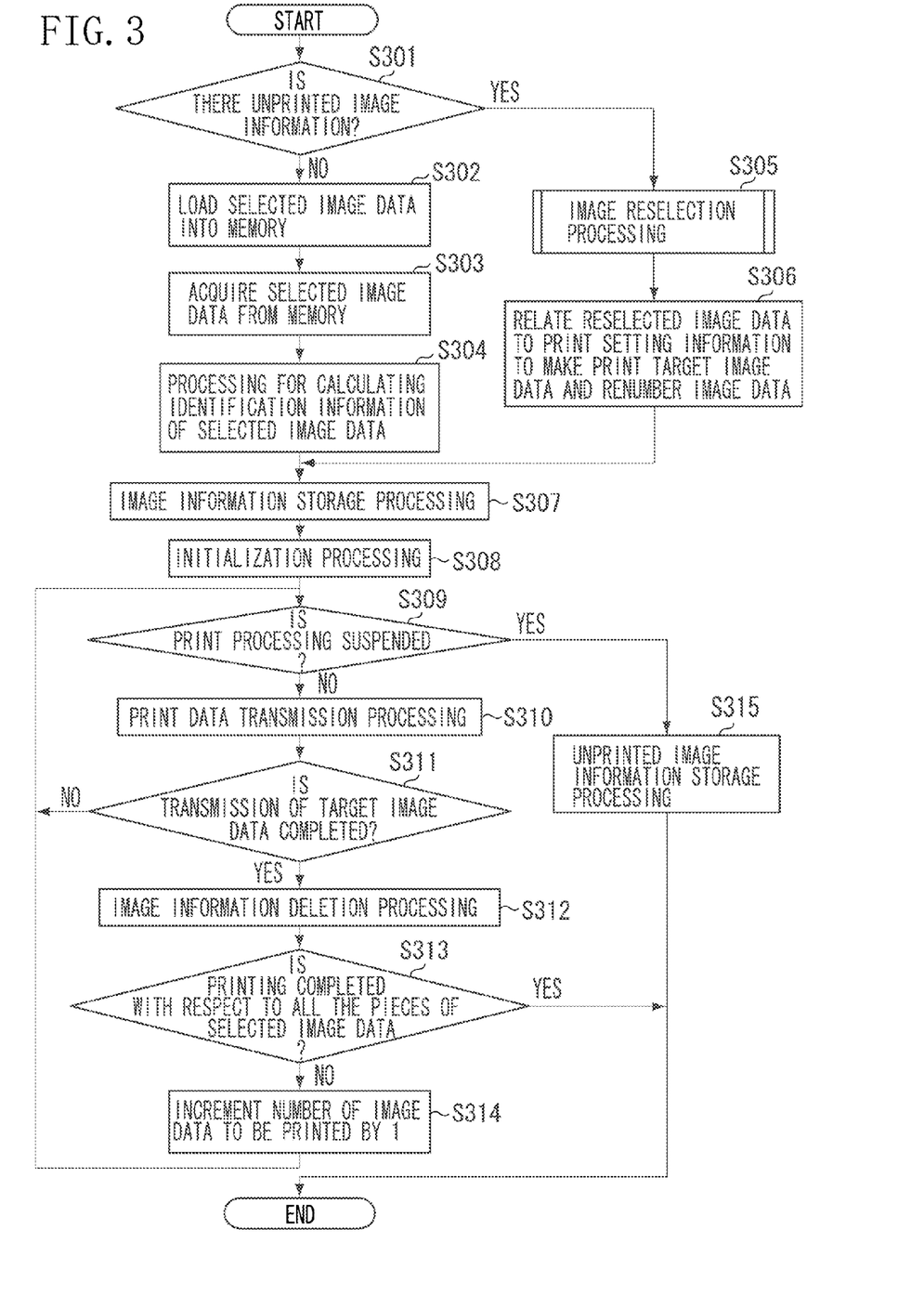
FIG. 3 is a flow chart illustrating processing by the printing system according to an exemplary embodiment.

FIG. 3 is a flow chart illustrating processing performed by the printing system according to the first exemplary embodiment. The flow chart illustrated in FIG. 3 illustrates steps of processing from the user's selection of the image data to be printed till the suspension of the print processing of the image data and the resumption of the print processing of the image data. The processing illustrated in FIG. 3 is realized by the CPU 111 executing the OS 201 and the AP 202. In the present exemplary embodiment, a graphical user interface (UI) is employed as a unit for providing information to the user and a unit for prompting the user to input an instruction. However, the processing can be realized not only by the graphical UI but also by a text base-UI that uses, for example, terminal software.

Initially, processing from the user's selection of the image data to be printed till the suspension of the print processing of the image data is described below. When the user executes the AP 202, in step S301, the AP 202 determines whether there is image information of unprinted image data. In the case of a timing when the print processing is not resumed, there is no unprinted image data or no image information thereof because the image information thereof has been erased (NO in step S301), so that the processing proceeds to step S302. On the other hand, in the case of a timing when the print processing is resumed, there are a plurality of pieces of unprinted image data and the image information thereof is still under control (YES in step S301), so that the processing proceeds to step S305.

In step S302, the image selection unit 216 of the OS 201 acquires the image data selected by the user as the print target from the storage device 116 and loads the image data into the memory 114. In the present exemplary embodiment, it is provided that, because of a limit of a system of the OS 201, the AP 202 can acquire the image data from the OS 201 only under a condition that the image data is loaded into the memory 114. More specifically, in the present exemplary embodiment, it is provided that the AP 202 cannot acquire information of the image data, i.e., a path, a file name, or an image ID of the image data, that can identify the image data selected by the user as the print target. Therefore, the AP 202 cannot identify or acquire the image data from the storage device 116.

Then, the user clicks a print start button on a print instruction screen to thereby instruct a start of the print processing of the image data as the print target to the AP 202. In step S303, the selected image acquisition unit 212 acquires the image data as the print target loaded into the memory 114. In step S304, the identification information calculation unit 213 calculates the identification information of the image data acquired by the selected image acquisition unit 212. In the present exemplary embodiment, a feature quantity of the image data is calculated as the identification information of the image data. A hash value is known to the public as a suitable feature quantity of the image data. A hash function for calculating the hash value is a function for calculating data having a fixed length based on data having an arbitrary length. When different image data is input into the function, different data having several hundreds of bits is calculated. Typical examples of such hash function include the Message Digest 5 (MD5) and the Secure Hash Algorithm (SHA). It is provided that the hash value to be calculated here is HAn. In step S307, the information storage unit 214 stores a combination of the hash value HAn as the identification information of the image data and print setting information Sn of the image data as image information. A storage destination of the image information may be the memory 114 or may be the storage device 116. By using n, the number of pieces of the selected image data is represented by 1-nMax so as not to include overlapped numbers or dropout of the numbers. For example, in a case where the number of pieces of the image data the user selected is 10, nMax becomes 10 (i.e., nMax=10), and therefore, the hash value of the first image data becomes HA1, the hash value of the second image data becomes HA2, and the hash value of the tenth image data becomes HA10, respectively. In a similar manner, the print setting information of the first image data becomes S1, and the print setting information of the tenth image data becomes S10. Hereinafter, HAn represents all the hash values stored in the memory 114 or the storage device 116. Similarly, Sn represents all the pieces of the print setting information stored in the memory 114 or the storage device 116.

In step S308, the AP 202 performs initialization processing, where the number x of the image data as the print target is filled with 1 (i.e., x=1). In step S309, the AP 202 determines whether the print processing of the image data is suspended. In a case where the print processing of the image data is not suspended (NO in step S309), the processing proceeds to step S310. On the other hand, in a case where the print processing of the image data is suspended (YES in step S309), the processing proceeds to step S315. In step S310, the printer driver 203 receives the x-th image data as the print target from the AP 202 to convert the image data into a printable format and transmits the converted image data to the printer 102. In step S311, the printer driver 203 determines whether the transmission of the x-th image data as the print target to the printer 102 is completed. In a case where the transmission of the image data to the printer 102 is completed (YES in step 311), the processing proceeds to step S312. On the other hand, in a case where the transmission of the image data to the printer 102 is not completed (NO in step S311), the processing returns to step S309.

In step S312, the AP 202 deletes the image information of the image data after the image data is printed. In other words, a print condition is controlled by the deletion of a combination of the hash value HAx and the print setting information Sx of the x-th image data as the print target having been printed (i.e., image information). In step S313, the AP 202 determines whether all the pieces of image data selected as the print target are printed. In a case where all the pieces of image data selected as the print target are not printed yet (NO in step S313), the processing proceeds to step S314. On the other hand, in a case where all the pieces of image data selected as the print target are printed (YES in step S313), the processing ends. In step S314, the AP 202 increments the number x of the image data as the print target by 1.

In a case where it is determined that the print processing is suspended in step S309, then in step S315, the information storage unit 214 of the AP 202 renumbers the hash values HAx through HAnMax of the unprinted image data and the print setting information Sx through SnMax to HA1 through HAnMax-x+1 and S1 through SnMax-x+1, respectively, and stores the renumbered values. The information storage unit 214 causes not the memory 114 but the storage device 116 to store the image information made of a combination of the hash value and the print setting information of the unprinted image data. Accordingly, even if the AP 202 is closed after the suspension of the print processing, the image information stored in the storage device 116 is not discarded. Further, the image information includes only the hash value and the print setting information, so that a consumption of a storage capacity and a time required for storage processing can be saved in comparison with a case of storing the image data itself. The AP 202 ends the processing after the image information is retained in the storage device 116.

Now, the resumption processing of the printing of the image data is described below. When the user executes the AP 202 again, the AP 202 determines whether there is the image information of the unprinted image data in step S301 of FIG. 3. In a case where there is the image information of the unprinted image data (YES in step S301), then in step S305, the AP 202 performs image reselection processing.

Figure 4:
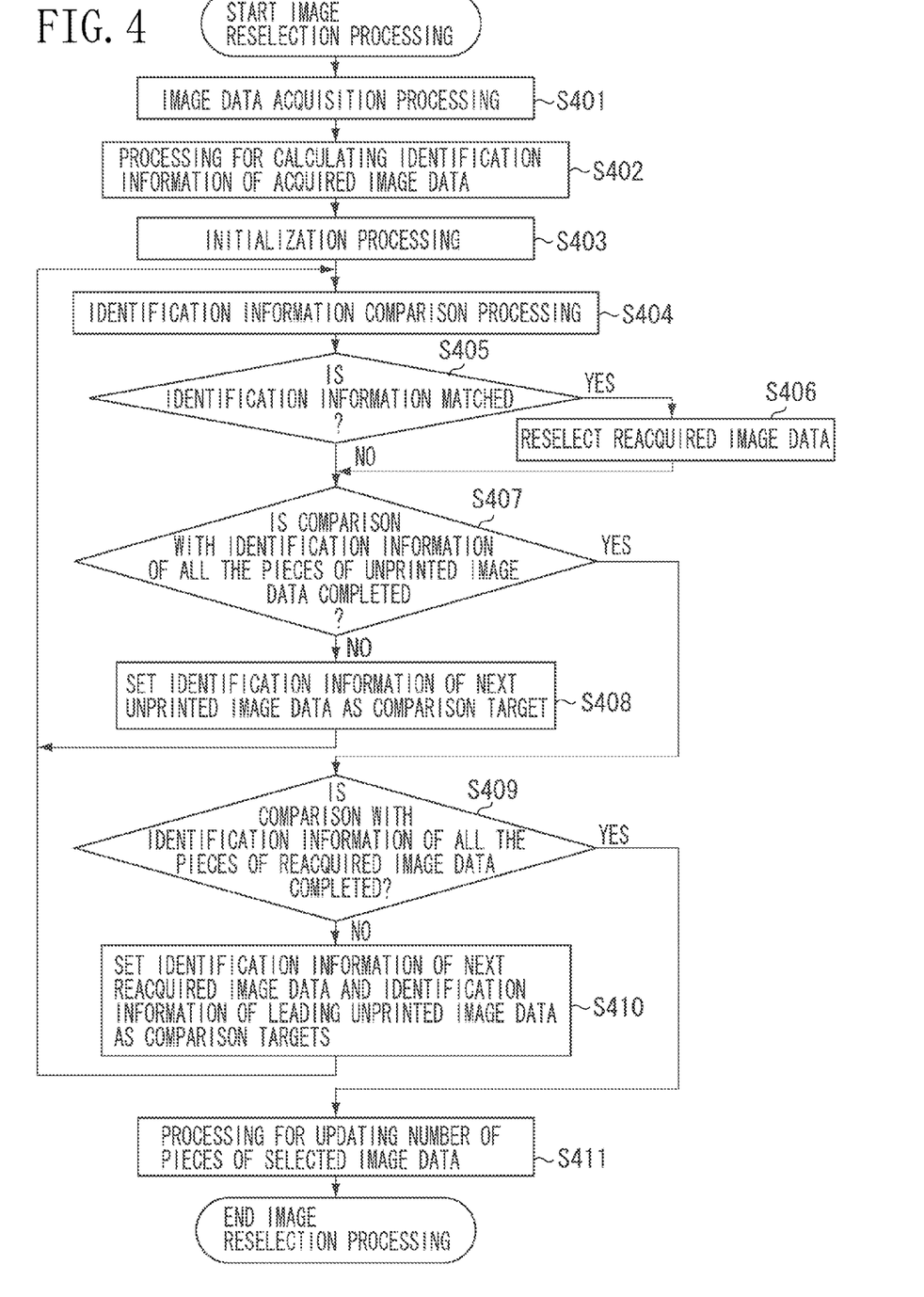
FIG. 4 is a flowchart illustrating image reselection processing in step S305 of FIG. 3 in detail.

FIG. 4 is a flow chart illustrating the image reselection processing in step S305 of FIG. 3 in detail. In step S401, the selected image acquisition unit 212 acquires all the pieces of image data stored in the storage device 116. The image data acquired in step S401 is hereinafter referred to as the reacquired image data. At this time, the AP 202 cannot acquire information such as a path, a file name, or an image ID, of the image data that can identify the image data. Therefore, at this step, the AP 202 cannot relate the reacquired image data to the image data selected by the user as the print target. It is provided that the number of pieces of the reacquired image data is represented by sMax. In step S402, the identification information calculation unit 213 calculates a hash value HBs as the identification information of the image data with respect to each of all the pieces of reacquired image data. By using s, a number of the image data is numbered by 1 through sMax so as not to include overlapped numbers or dropout of the numbers. For example, in a case where the number of pieces of image data acquired in step S401 is 20, sMax becomes 20 (i.e., sMax=20) and thus the hash value of the first image data becomes HB1, the hash value of the second image data becomes HB2, and the hash value of the twelfth image data becomes HB20, respectively.

In step S403, the AP 202 performs the initialization processing where variables x and y required for comparison processing between the hash value HAn stored in step S315 and the hash value HBs calculated in step S402 and the reselected image number r are filled with 1, 1, and 0, respectively (i.e., X=1, Y=1, and r=0). In step S404, the AP 202 performs the comparison processing between the hash value HAx of the x-th unprinted image data and the hash value HBy of the y-th reacquired image data. In step S405, the AP 202 determines whether the x-th hash value HAx matches the y-th hash value HBy. In a case where the hash value HAx matches the hash value HBy (YES in step S405), the processing proceeds to step S406. In a case where the hash value HAx does not match the hash value HBy (NO in step S405), the processing proceeds to step S407 instead of executing step S406. In step S406, the AP 202 selects the y-th reacquired image data as the x-th unprinted image data that is to be printed in accordance with the print setting information Sx and relates the y-th reacquired image data to the print setting information Sx. At the same time, the AP 202 increments the number of the reselected image r by 1. The reacquired image data selected in step S406 is hereinafter referred to as the reselected image data.

In step S407, the AP 202 determines whether the comparison processing performed between the hash values HAn of all the pieces of unprinted image data and the hash value HBy of the y-th reacquired image data is completed. In a case where the comparison processing between the hash values HAn of all the pieces of unprinted image data and the hash value HBy of the y-th reacquired image data is completed (YES in step S407), the processing proceeds to step S409. On the other hand, in a case where the comparison processing between the hash values HAn of all the pieces of unprinted image data and the hash value HBy of the y-th reacquired image data is not completed (NO in step S407), the processing proceeds to step S408.

In step S408, the AP 202 increments the variable x by 1 and sets the hash value HAx of the next unprinted image data to the target of the comparison processing with the hash value HBy of the reacquired image data. Then, the processing returns to step S404 and the comparison processing is executed between the hash value HAx of the next unprinted image data and the hash value HBy of the reacquired image data.

In step S409, the AP 202 determines whether the comparison processing is completed with respect to the hash value HBs of each of all the pieces of reacquired image data. In a case where the comparison is not completed with respect to the hash value HBs of each of all the pieces of reacquired image data (NO in step S409), the processing proceeds to step S410. On the other hand, in a case where the comparison is completed with respect to the hash value HBs of each of all the pieces of reacquired image data (YES in step S409), the processing proceeds to step S411. In step S410, the AP 202 increments y by 1 and fills x with 1 (i.e., x=1) in order to compare the hash value HBy of the next reacquired image data with the hash value HAn of the leading unprinted image data. The processing returns to step S404 to execute the comparison processing between the hash value HBy of the next reacquired image data and the hash value HAn of the leading unprinted image data. In step S411, the AP 202 updates the number of the selected images nMax with the number of the reselected images r. Then, the processing proceeds to step S306 of FIG. 3. In step S306, the identification information calculation unit 213 relates the reselected image data to the print setting information and renumbers the numbers of the image data as the print target with the numbers 1 through nMax. The number nMax is the value updated in step S411. In step S307 and subsequent steps, the print processing is resumed, provided that the reselected image data is regarded as the print target, based on the hash values HAn corresponding to the numbers renumbered in step S306 and the print setting information Sn. In other words, in step S307 and subsequent steps, the printing of the reselected image data corresponding to the hash value HAn is controlled according to the print setting information Sn.

In the present exemplary embodiment, when the comparison processing between the hash value HAn of each of all the pieces of unprinted image data and the hash value HBy of the y-th reacquired image data (i.e., step S407) is completed, there is a case that a plurality of hash values HBy of the plurality of reacquired image data match the hash value HAn of certain unprinted image data. More specifically, there is a case where there exist a plurality of pieces of reacquired image data that match the certain unprinted image data. In such a case, in the present exemplary embodiment, all the pieces of the plurality of reacquired image data that are matched are recognized as the reselected image data. Unlimited to the above, since a piece of reselected image data is always related to a piece of unprinted image data, in a case where there are the plurality pieces of reacquired image data that match the certain unprinted image data, the user may be allowed to select a piece of reacquired image data from the plurality of pieces of reacquired image data.

In the present exemplary embodiment, when the comparison processing between the hash value HAn of each of all the pieces of unprinted image data and the hash value HBy of the y-th reacquired image data (i.e., step S407) is completed, there is a case that there exists no hash value HBy of the reacquired image data that matches any of the hash values HAn of the unprinted image data. More specifically, there is a case that no reacquired image data that matches any one of the plurality of pieces of unprinted image data exists for the reasons that the image data is deleted before the resumption of the print processing or the like. In such a case, in the present exemplary embodiment, the processing is advanced without notifying it to the user. However, unlimited to the above, in a case where there is no reacquired image data that matches the unprinted image data, the user may be notified of the presence of the image data that cannot be reselected among the unprinted image data.

Further, in the present exemplary embodiment, in steps S404 through S408, the hash value HBy of one of the plurality of pieces of reacquired image data is compared with the hash values HAn of all the pieces of unprinted image data. Alternatively, in order to shorten the time required for the comparison processing, the hash value of the unprinted image data that is determined to be matched with the hash value HBy of the reacquired image data and that is reselected may be excluded from the comparison target.

In the present exemplary embodiment, since the hash values of all the pieces of the image data to be subjected to the print processing are calculated, all the pieces of the image data that are selected as the print target can be identified regardless of whether the image data is printed. However, since a better effect can be produced in an aspect of user-friendliness if only the unprinted image data is reselected, the image information relating to the image data after being printed is sequentially deleted. As a result thereof, the image data to be identified can be narrowed only to the unprinted image data. Accordingly, the print processing can be resumed after only the unprinted image data is automatically identified. In other words, upon resuming the print processing after the suspension of the print processing, the user is no longer required to search the unprinted image data, thus resulting in producing an effect that a load of the user decreases. On the other hand, in a case where the user desires to print all the pieces of image data selected as the print target again regardless of whether the printing of any of these pieces of image data is completed, all the pieces of image data selected as the print target can be reselected by not executing the deletion of the image information of the image data printed in step S312 and by holding the hash values HAx through HAnMax and the print setting information Sx through SnMax of all the pieces of image data selected as the print target in step S315. Whether only the pieces of the unprinted image data are reselected or whether all the pieces of the image data selected as the print target are reselected may be switched according to an instruction of the user.

In the present exemplary embodiment, the print condition of each of the plurality of pieces of image data selected as the print target is controlled by deleting the image information thereof. However, as far as a determination can be made as to whether the print processing is completed, any method can be employed in addition to the above. For example, the print condition may be recognized by adding a flag indicating the completion of the print processing to the image information of the image data having been printed and also the print condition may be determined based on the image number x of the image data now in printing. Further, in the present exemplary embodiment, in the resumption of the print processing of the image data, in a case where there is the image information of the unprinted image data, the identification information thereof is immediately acquired. The more the number of images, the more the time required for acquiring the identification information thereof. This may invite a load for the user who does not reselect the images. Therefore, the user may be allowed to select whether to perform the reselection processing of the image data.

In the present exemplary embodiment, the hash value is used as a feature quantity as the identification information of the image data. However, a hash function other than the MD5 and the SHA may be employed as a typical example of the method for calculating the hash value. In addition to the above, upon calculating the hash value, the image data after a size of the original image data thereof is reduced to a certain size may be employed. Although in a case where the hash value calculated based on the reduced image data matches, there is a case that the original image data does not always match. Consequently, in order to identify whether the reselected image data is the image data previously selected as the print target, the reselected image data may be indicated to the user by the display unit 115.

The reselected image data may be indicated to the user at every time when the reselected image data is found in step S401 or all the pieces of the reselected image data may be indicated to the user before the start of the print processing performed in and after step S305. After the reselected image data is indicated to the user, processing such as the resumption of the print processing, a change of the image data, and a cancellation of the print processing, is performed according to the instruction of the user. The hash value may not be calculated for all of the pieces of the image data but the hash value may be obtained for a portion of all the pieces of the image data.

A second exemplary embodiment is described below. In the above-described first exemplary embodiment, the hash value is calculated in step S304. The user can reselect all the pieces of image data selected as the print target by calculating the hash value at this timing regardless of whether the print processing of the image data selected as the print target is completed. Further, the deletion of the image information having been printed in step S312 enables the reselection of only the unprinted image data. On the other hand, in the second exemplary embodiment, only the hash value of the unprinted image data is calculated under a condition that the print processing is suspended. With such a configuration, unnecessary calculation of the hash value is not performed and the user can reselect only the unprinted image data. A configuration of the printing system and a software configuration of the user terminal according to the second exemplary embodiment are similar to those illustrated in FIGS. 1 and 2, respectively.

Figure 5:
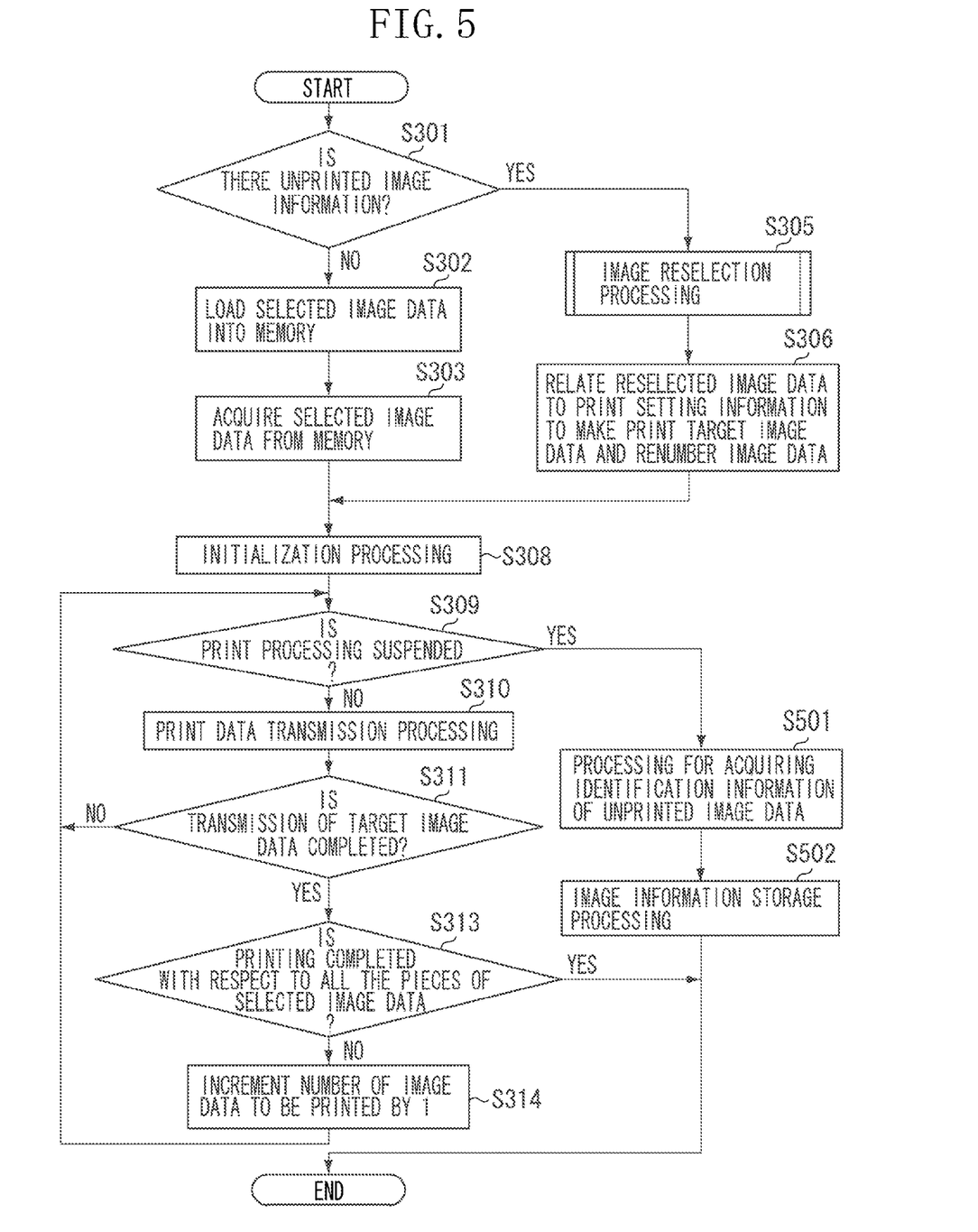
FIG. 5 is a flow chart illustrating processing by a printing system according to another exemplary embodiment.

Steps of processing by the printing system according to the second exemplary embodiment are described below with reference to FIG. 5 except for the steps similar to those described in the first exemplary embodiment.

Initially, the steps of the processing before the print processing is suspended are described below. In FIG. 5, processing performed in each of steps S301, S302, and S303 is similar to the corresponding processing described in the first exemplary embodiment. At the moment, the processing advances to the print processing without calculating the hash value or holding the hash value and the print setting information as the image information. Further, in FIG. 5, processing performed in each of steps S308, S309, S310, S311, S313, and S314 is similar to the corresponding processing described in the first exemplary embodiment.

Since the image information is not held yet in the processing before the print processing is suspended, no deletion processing is required with respect to the image information. In a case where it is determined that the print processing is suspended in step S309, then in step S501, the identification information calculation unit 213 calculates the identification information with respect to each of the plurality of pieces of unprinted image data. A method for calculating the identification information here is similar to that performed in step S304 of FIG. 3 according to the first exemplary embodiment. That is, the hash value as the feature quantity of the image data is calculated as the identification information. Therefore, the hash values HAn are calculated in step S501 in the second exemplary embodiment. Further, in the second exemplary embodiment, numbers of 1 through nMax are assigned to the plurality of pieces of unprinted image data. By using n as the image number, the number of unprinted image data is represented by nMax. In step S502, the AP 202 holds the image information including the hash value HAn of the unprinted image data and the print setting information Sn corresponding to each other in the storage device 116. Similar to step S315 of the first exemplary embodiment, the image information is held not in the memory 114 but in the storage device 116.

Now, the processing for resuming the print processing is described below. In the processing for resuming the print processing, the processing performed in each of steps S301, S305, and S306 is similar to that performed in the corresponding step of the first exemplary embodiment. A flow of steps S308, S309, S310, S311, S313, S314, S501, and S502 corresponds to the processing before the print processing is completed or the processing before the print processing is suspended in the present exemplary embodiment.

As described above, the calculation of the hash value in step S501 when the print processing is suspended eliminates a necessity of the control of the print condition, i.e., the condition whether the print processing is completed. Therefore, the print processing can be resumed after only the unprinted image data is identified. In the present exemplary embodiment, the hash value is used as the identification information of the image data. However, the identification information of the image data is not limited to the hash value as it is the same as the case of the first exemplary embodiment. Further, the reselected image data may be indicated to the user so as to allow the user to confirm the image data in a similar manner performed in the first exemplary embodiment.

Now, a third exemplary embodiment is described below. In the first and the second exemplary embodiments, the hash values of all the pieces of the image data are calculated when the hash values are calculated. However, although a time required for calculating the hash values of all the pieces of image data is shorter than a time for replicating the image data, the load required for calculating the hash values is not small. In the present exemplary embodiment, the comparison is initially made by using the hash values of the portion of all the pieces of image data and the further comparison is made by using the hash values of all the pieces of image data in a case where the hash values match in the prior comparison, thereby narrowing the number of images for which the hash values are to be calculated among all the pieces of the image data. As a result thereof, computational complexity of the hash values is reduced as well as a time required for the processing is reduced. A configuration of the printing system and a configuration of the software of the user terminal according to the third exemplary embodiment are similar to those illustrated in FIGS. 1 and 2, respectively.

Now, the specific processing of the present exemplary embodiment is described with reference to FIGS. 3 and 4 except for the processing similar to that performed in the first exemplary embodiment. Initially, the processing before the print processing is suspended is described below. Each of the processing performed in and before step S303 is similar to the corresponding processing performed in the first exemplary embodiment. The hash values of the portion of all the pieces of the image data are calculated in addition to the hash values of all the pieces of the image data when the hash value of the image data selected as the print target in step S304 is calculated. In the present exemplary embodiment, the leading 10 bytes of the image data is set to a calculation target of the hash value as the portion of all the pieces of image data. The hash value of the selected image data with respect to all the pieces of image data is regarded as the feature quantity A1 and the hash value of the leading 10 bytes of the image data is regarded as the feature quantity A2, respectively. In step S307, the AP 202 causes the feature quantity A1 and the feature quantity A2 to be related to the corresponding print setting information so as to be stored as the image information. Each of steps in and after step S309 is similar to the corresponding step performed in the first exemplary embodiment.

Now, the processing to be performed when the print processing is resumed is described below. In the reselection processing of the image data in step S305, the processing performed in step S401 is similar to the processing performed in the first exemplary embodiment. In step S402, the identification information calculation unit 213 calculates the hash value of the leading 10 bytes of the reacquired image data and the thus calculated hash value is regarded as a feature quantity B2. The hash values of all the pieces of reacquired image data are not calculated here. In step S404, the AP 202 compares the feature quantity B2 calculated in step S402 with the feature quantity A2 stored in step S307. In a case where the feature quantity A2 does not match the feature quantity B2 (NO in step S405), i.e., it is determined that the feature quantities do not match each other in step S405, the processing proceeds to step S407. On the other hand, in a case where the feature quantity A2 matches the feature quantity B2 (YES in step S405), the AP 202 calculates the hash values with respect to all the pieces of reacquired image data having the feature quantity matched. Thus calculated hash values are regarded as the feature quantity B1 and are compared with the feature quantity A1. In a case where the feature quantity A1 matches the feature quantity B1 (YES in step S405), i.e., it is determined that the feature quantities match each other in step S405, and thus the processing proceeds to step S406. In a case where the feature quantity A1 does not match the feature quantity B1 (NO in step S405), i.e., it is determined that the feature quantities do not match each other in step S405 and thus the processing proceeds to step S407. Each of the processing performed in and after steps S406 and S407 is similar to the processing performed in the first exemplary embodiment. The processing performed in and after step S306 is similar to the processing performed in the first exemplary embodiment.

As described above, a comparison is initially made with the hash values of the portion of all the pieces of image data so as to narrow the number of pieces of image data that are subjected to a calculation of the hash values among all the pieces of image data, thereby reducing a computational complexity of the hash values. Therefore, a time required for the reselection processing of the image data when the print processing is resumed can be reduced.

In the present exemplary embodiment, the leading 10 bytes of the image data is used as a portion of all the pieces of image data to be subjected to the calculation of the hash values. However, unlimited thereto, as far as the same area of the image data is used as the calculation target in steps S304 and S402, the portion of all the pieces of image data may be any portion, e.g., may be the 20 bytes of the image data with reference to the thirtieth byte from the top.

In the present exemplary embodiment, a method for narrowing the number of pieces of image data, subjected to the calculation of the hash values, among all the pieces of image data uses the portion of all the pieces of image data. The method, however, is not limited thereto. The method may use a shooting date and time and a shooting position (i.e., GPS information) included in the Exchangeable Image Format (EXIF) to narrow the number of pieces of the image data if information of, for example, the EXIF is acquirable. For example, the method may be performed such that, after the number of pieces of image data is narrowed with the leading 10 bytes of the image data, the thus narrowed number of pieces of image data is further narrowed with the leading 30 bytes, i.e., the number of pieces of image data may be narrowed through a plurality of steps.

As described above, according to the above-described exemplary embodiment, at the time that the print processing is resumed after the print processing is once suspended, the processing for identifying the image data selected as the print target can be executed within a processing time shorter than a processing time required in the replication processing of the image data and with the storage capacity less than a storage capacity required in the replication processing of the image data.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In an example, a computer-readable medium may store a program that causes an information processing apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-054825 filed Mar. 11, 2010, which is hereby incorporated by reference herein in its entirety.

What is claimed is:

1. An information processing apparatus comprising:
an activation unit configured to activate an application for executing print processing;
a first calculation unit configured to calculate a first hash value for identifying first image data selected as a print target using all pieces of the first image data, and calculate a second hash value for identifying the first image data using a part of the first image data;
a storage unit configured to store the first hash value and the second hash value in a case where the print processing based on the first image data is suspended;
a second calculation unit configured to calculate, in a case where the application is re-executed and the print processing is resumed, a plurality of third hash values for identifying a plurality of second image data pieces stored in the image processing apparatus using a part of each of the second image data pieces;
a third calculation unit configured to calculate, in a case where the second hash value matches the third hash value, a fourth hash value for identifying second image data corresponding to the matched third hash value using all pieces of the identified second image data corresponding to the matched third hash value; and
a processing unit configured to process print processing of the identified second image data in a case where the first hash value matches the fourth hash value.

2. The information processing apparatus according to claim 1, wherein the first calculation unit calculates first hash values of all pieces of the first image data selected as a print target before the print processing is suspended.

3. The information processing apparatus according to claim 2, further comprising a deletion unit configured to delete information corresponding to the first image data whose print processing is completed among the first hash value calculated by the first calculation unit,
wherein the processing unit identifies image data that matches the first image data from the plurality of second image data pieces, based on information that is not deleted by the deletion unit, among the first hash value calculated by the first calculation unit, and the third hash value.

4. The information processing apparatus according to claim 1, wherein the first calculation unit calculates the first hash value of imaged data whose print processing is not completed among the first image data selected as the print target in a state where the print processing is suspended.

5. The information processing apparatus according to claim 1, further comprising a print control unit configured to execute print processing of the second image data identified by the processing unit as image data that matches the first image data according to print setting information indicating a print setting of the first image data selected as the print target.

6. The information processing apparatus according to claim 1, further comprising an indication unit configured to indicate the second image data identified by the processing unit as image data that matches the first image data to a user.

7. A method for an information processing apparatus, the method comprising:
  activating an application for executing print processing;
  calculating a first hash value for identifying first image data selected as a print target using all pieces of the first image data, and calculate a second hash value for identifying the first image data using a part of the first image data;
  storing the first hash value and the second hash value in a case where the print processing based on the first image data is suspended;
  calculating, in a case where the application is re-executed and the print processing is resumed, a plurality of third hash values for identifying a plurality of second image data pieces stored in the image processing apparatus using a part of each of the second image data pieces;
  calculating, in a case where the second hash value matches the third hash value, a fourth hash value for identifying second image data corresponding to the matched third hash value using all pieces of the identified second image data corresponding to the matched third hash value; and
  processing print processing of the identified second image data in a case where the first hash value matches the fourth hash value.

8. The method according to claim 7, wherein calculating includes calculating first hash values of all pieces of the first image data selected as a print target before the print processing is suspended.

9. The method according to claim 8, further comprising deleting information corresponding to the first image data whose print processing is completed among the calculated first hash value,
  wherein processing includes identifying image data that matches the first image data from the plurality of second image data pieces, based on information that is not deleted, among the calculated first hash value, and the third hash value.

10. The method according to claim 7, wherein calculating includes calculating the first hash value of imaged data whose print processing is not completed among the first image data selected as the print target in a state where the print processing is suspended.

11. The method according to claim 7, further comprising executing print processing of the identified second image data as image data that matches the first image data according to print setting information indicating a print setting of the first image data selected as the print target.

12. The method according to claim 7, further comprising indicating the identified second image data as image data that matches the first image data to a user.

13. A non-transitory computer-readable storage medium storing a program to cause an information processing apparatus to perform a method, the method comprising:
  activating an application for executing print processing;
  calculating a first hash value for identifying first image data selected as a print target using all pieces of the first image data, and calculate a second hash value for identifying the first image data using a part of the first image data;
  storing the first hash value and the second hash value in a case where the print processing based on the first image data is suspended;
  calculating, in a case where the application is re-executed and the print processing is resumed, a plurality of third hash values for identifying a plurality of second image data pieces stored in the image processing apparatus using a part of each of the second image data pieces;
  calculating, in a case where the second hash value matches the third hash value, a fourth hash value for identifying second image data corresponding to the matched third hash value using all pieces of the identified second image data corresponding to the matched third hash value; and
  processing print processing of the identified second image data in a case where the first hash value matches the fourth hash value.

* * * * *